US011255597B2

(12) United States Patent
Zhang et al.

(10) Patent No.: US 11,255,597 B2
(45) Date of Patent: Feb. 22, 2022

(54) REFRIGERATOR

(71) Applicant: QINGDAO HAIER CO., LTD., Qingdao (CN)

(72) Inventors: Hao Zhang, Qingdao (CN); Chun Yang, Qingdao (CN); Enpin Xia, Qingdao (CN); Jianquan Chen, Qingdao (CN)

(73) Assignee: QINGDAO HAIER CO., LTD., Qingdao (CN)

( * ) Notice: Subject to any disclaimer, the term of this patent is extended or adjusted under 35 U.S.C. 154(b) by 252 days.

(21) Appl. No.: 16/493,755

(22) PCT Filed: Dec. 7, 2018

(86) PCT No.: PCT/CN2018/119767
§ 371 (c)(1),
(2) Date: Sep. 12, 2019

(87) PCT Pub. No.: WO2019/114623
PCT Pub. Date: Jun. 20, 2019

(65) Prior Publication Data
US 2020/0033048 A1 Jan. 30, 2020

(30) Foreign Application Priority Data
Dec. 11, 2017 (CN) .......................... 201711311273.8

(51) Int. Cl.
*F25D 11/02* (2006.01)
*F25D 17/04* (2006.01)
*F25D 23/06* (2006.01)

(52) U.S. Cl.
CPC ............ *F25D 23/061* (2013.01); *F25D 11/02* (2013.01); *F25D 17/04* (2013.01); *F25B 2500/12* (2013.01)

(58) Field of Classification Search
CPC ...... F25D 23/061; F25D 23/10; F25D 17/042; F25D 23/087; F25D 23/08; F16J 15/104
See application file for complete search history.

(56) References Cited

U.S. PATENT DOCUMENTS 6,142,825 A * 11/2000 Shinchi .............. H01R 13/5216
439/587
8,491,335 B2 * 7/2013 Matsumoto .......... H01R 13/506
439/587

(Continued)

FOREIGN PATENT DOCUMENTS

CN 101886624 A 11/2010
CN 203374790 U 1/2014
(Continued)

*Primary Examiner* — Ana M Vazquez
(74) *Attorney, Agent, or Firm* — Cheng-Ju Chiang (57) ABSTRACT

A seal includes a buckling portion. The buckling portion is composed of two H-shaped members that are flexibly connected. The two H-shaped members are buckled with each other to form a mounted state. The H-shaped member has a first arm and a second arm which are parallel to each other, and a connecting portion which connects the first arm and the second arm. The connecting portion has an arcuate surface. The arcuate surfaces of the two H-shaped members cooperatively define a hollow cavity when the two H-shaped members are in the mounted state. A vacuum assembly and a refrigerator are disclosed to respectively have the seal.

9 Claims, 6 Drawing Sheets

(56) References Cited

U.S. PATENT DOCUMENTS

2004/0239047 A1* 12/2004 Kent .................... F16J 15/3236
277/628
2006/0240710 A1 10/2006 Kato et al.

FOREIGN PATENT DOCUMENTS

| CN | 103644699 A | 3/2014 |
|---|---|---|
| CN | 104675676 A | 6/2015 |
| CN | 105101718 A | 11/2015 |
| CN | 106098051 A | 11/2016 |
| CN | 108253716 A | 7/2018 |
| JP | 2011-171761 A | 9/2011 |
| WO | 98/28558 A1 | 7/1998 |
| WO | 2016/206915 A1 | 12/2016 |

* cited by examiner

REFRIGERATOR

The present application is a 35 U.S.C. § 371 National Phase conversion of International (PCT) Patent Application No. PCT/CN2018/119767, filed on Dec. 7, 2018, which claims priority to Chinese Patent Application No. 201711311273.8, filed on Dec. 11, 2017 and filed "SEAL, VACUUM ASSEMBLY AND REFRIGERATOR", which is incorporated herein by reference in its entirety. The PCT International Patent Application was filed and published in Chinese.

TECHNICAL FIELD

The present invention belongs to the technical field of noise reduction of refrigeration equipment, and particularly relates to a seal for reducing the noise of a vacuum pump.

BACKGROUND

The freshness-keeping of food in a refrigerator is closely related to temperature, humidity and air environment. Oxygen is an important factor causing food spoilage and bacterial reproduction. The freshness-keeping duration of the food can be significantly extended by means of controlling the ratio of nitrogen to oxygen in the refrigerator by suctioning the oxygen within the compartments.

Oxygen can be exhausted from a specific space by a vacuum pump and discharged to the outside of the refrigerator. However, as a medium for conducting sound, air will conduct noise within the refrigerator body to the space external to the refrigerator during discharge of the air, which causes noise disturbances.

SUMMARY

An objective of the present invention is to provide a sealing device that solves the problem of noise output from the refrigerator body.

To realize the above objective of the present invention, the present invention provides a seal including a buckling portion. The buckling portion is composed of two H-shaped members that are flexibly connected. The two H-shaped members can be buckled with each other to form a mounted state. The H-shaped member has a first arm and a second arm which are parallel to each other, and a connecting portion which connects the first arm and the second arm. The connecting portion has an arcuate surface. The arcuate surfaces of the two H-shaped members cooperatively define a hollow cavity when the two H-shaped members are in the mounted state.

Further, the seal is an elastic member.

Further, the arcuate surface is wavy, and the arcuate surfaces of the two H-shaped members cooperatively define a plurality of hollow cavities when the two H-shaped members are in the mounted state.

Further, the seal comprises an annular portion connected with the buckling portion, wherein the annular portion and the buckling portion are integrally formed.

In addition, the present invention further provides a vacuum assembly for a refrigerator, comprising:

a sealed box comprising an upper sealing body and a lower sealing body, wherein the upper sealing body and the lower sealing body can be buckled to define an accommodating cavity, and a notch portion is provided at the joint between the upper sealing body and the lower sealing body;

a vacuum pump disposed in the accommodating cavity; and the seal, wherein the annular portion is matched with an engaging portion between the upper sealing body and the lower sealing body, and the mounted state of the buckling portion is matched with the notch portion.

Further, the first arm and the second arm are clamped on the edge of the notch portion when the two H-shaped members are in the mounted state.

Further, the bottom of the upper sealing body is provided with a first groove, and the top of the lower sealing body is provided with a second groove; the first groove and the second groove cooperatively define a mounting position of the annular portion of the seal.

Further, the connecting portion connects the first arm and the second arm through the notch portion.

Further, the vacuum assembly for the refrigerator comprises a vacuum pump disposed in the accommodating cavity, wherein a wire connected to the vacuum pump passes through the notch portion.

In addition, the present invention further provides a refrigerator comprising:

a sealed box comprising an upper sealing body and a lower sealing body, wherein the upper sealing body and the lower sealing body can be buckled to define an accommodating cavity, and a notch portion is provided at the joint between the upper sealing body and the lower sealing body; and the seal, wherein the annular portion is matched with an engaging portion between the upper sealing body and the lower sealing body, and a mounted state of the engaging portion is matched with the notch portion.

Compared with the prior art, the seal according to the present invention realizes vacuum sealing of the sealed box by an integral design, and by sealing the joint gap between the upper sealing body and the lower sealing body and sealing the notch portion for the wires to pass through.

DETAILED DESCRIPTION

The present invention will be described in detail below with reference to the specific embodiments shown in the accompanying drawings. However, these embodiments are not intended to limit the present invention, and modifications in structures, methods, or functions made by those common skilled in the art according to these embodiments are all included in the protection scope of the present invention.

The words expressing position and orientation described in the present invention are all referenced to the vacuum pump, the end close to the vacuum pump is a proximal end, and the end remote from the vacuum pump is a distal end.

Figure 1:
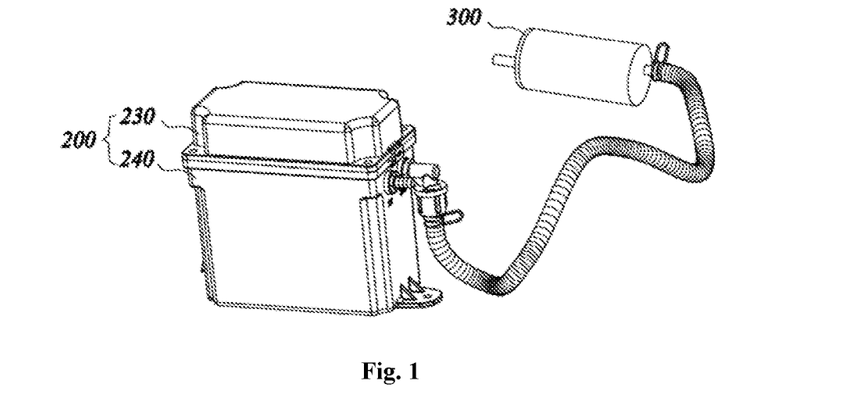
FIG. 1 is a schematic structural view of a sealed box according to an embodiment of the present invention.
Figure 2:
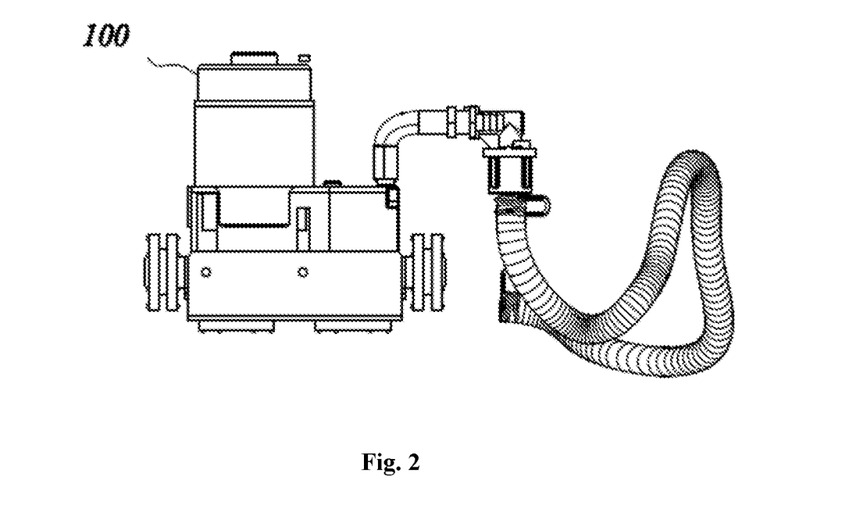
FIG. 2 is a schematic view of the components inside and outside the sealed box according to an embodiment of the present invention.
Figure 3:
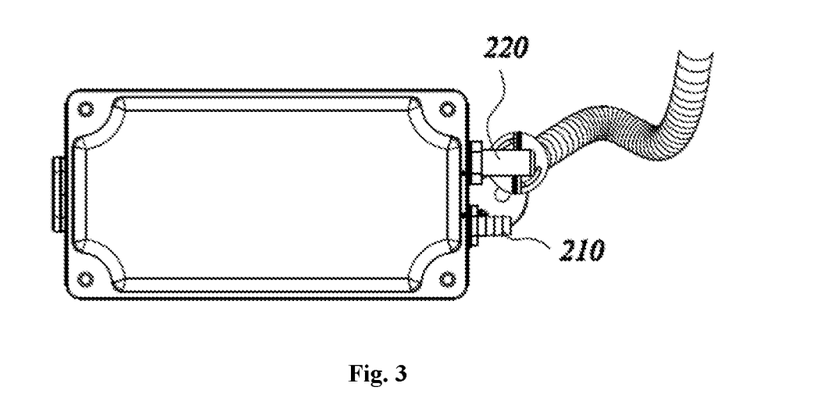
FIG. 3 is a top view of the sealed box according to an embodiment of the present invention.

Referring to FIG. 1 to FIG. 3, in an embodiment of the present invention, a vacuum pump 100 is accommodated within a sealed box 200, and is communicated with the external air through an inlet pipe 210 and an outlet pipe 220. The proximal end of the inlet pipe 210 is communicated with the inlet pipeline of the vacuum pump 100, and the distal end of the inlet pipe 210 is communicated with the freshness-keeping space (not shown) within the compartments of the refrigerator. The proximal end of the outlet pipe 220 is communicated with the outlet pipeline of the vacuum pump 100, and the distal end of the outlet pipe 220 extends towards the outside of the sealed box 200. The sealed box 200 blocks the air communication between the vacuum pump 100 and the mounting environment so as to achieve the effect of sound insulation. The freshness-keeping space may be a separate compartment or a completely closed or semi-closed local space in the compartment.

The sealed box 200 includes an upper sealing body 230 and a lower sealing body 240. The upper sealing body 230 includes a top wall and a side wall, which are integrally formed and cooperatively define an accommodating cavity opening downwardly. The lower sealing body 240 includes a bottom wall and a side wall, which are integrally formed and cooperatively define an accommodating cavity opening upwardly. The opening of the upper sealing body 230 and the opening of the lower sealing body 240 are matched with each other, and may be buckled with each other to form an accommodating space for the vacuum pump 100.

Preferably, the upper sealing body 230 and the lower sealing body 240 are made of a plastic material.

Figure 4:
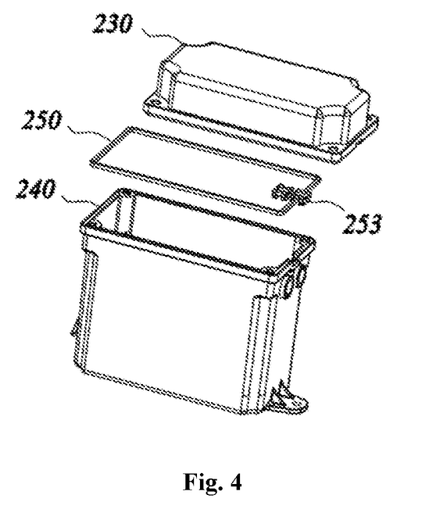
FIG. 4 is a schematic exploded view of the sealed box according to an embodiment of the present invention.

Referring to FIG. 4, a seal is disposed between the upper sealing body 230 and the lower sealing body 240. The lower edge of the side wall of the upper sealing body 230 forms a first groove, and the upper edge of the side wall of the lower sealing body 240 forms a second groove. The first groove is matched with the second groove to form a mounting groove for a sealing washer 250, and thus the air tightness between the upper sealing body 230 and the lower sealing body 240 after buckling can be ensured, so that the sound can be prevented from being transmitted from the splicing gap of the sealed box 200. The sealing washer 250 has an annular shape with a circular cross section, is made of an elastic material, and has a mounting tensile elongation amount of 2-5% when sleeved in the mounting groove. When the upper sealing body 230 and the lower sealing body 240 are buckled, a pressure is applied to the sealing washer 250 to compress the same by 20-30%, thereby ensuring a sealing effect.

Figure 5:
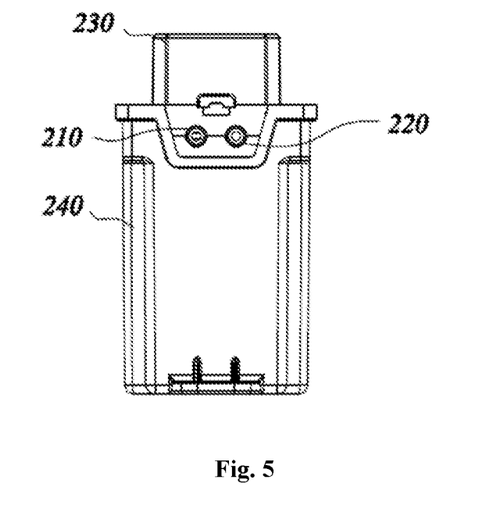
FIG. 5 is a front view of the sealed box according to an embodiment of the present invention.

FIG. 4 and FIG. 5 show that a notch portion 251 is provided at the joint between the upper sealing body 230 and the lower sealing body 240 for the wire connecting the vacuum pump 100. In order to ensure the sealing property of the sealed box 200, a buckling sealing ring 253 is disposed in the notch portion 251. The sealing ring 253 is made of an elastic material and integrally formed with the sealing washer 250.

Figure 6:
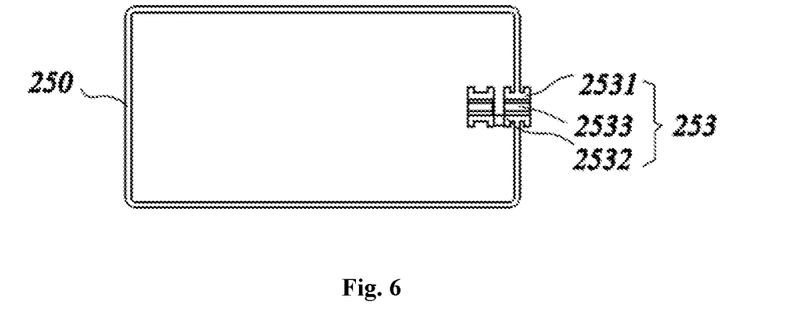
FIG. 6 is a top view of a seal according to an embodiment of the present invention.
Figure 7:
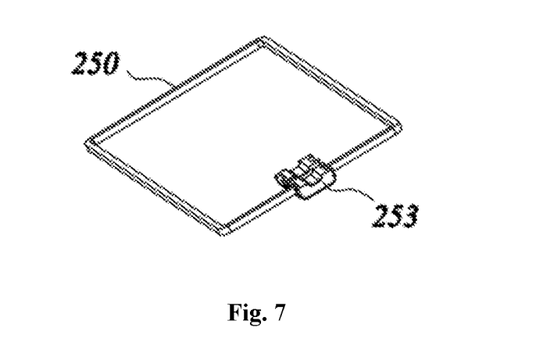
FIG. 7 is a schematic structural view of the seal according to an embodiment of the present invention.

Referring to FIG. 6 and FIG. 7, the sealing ring 253 is composed of two H-shaped members that are flexibly connected. The two H-shaped members can be buckled with each other to form a mounted state which is matched with the notch portion 251. The H-shaped member has a first arm 2531 and a second arm 2532 which are parallel to each other, and a connecting portion 2533 which connects the first arm 2531 and the second arm 2532. The first arm 2531 and the second arm 2532 can cooperate to sandwich the side walls of the box at the edge of the notch portion 251 to prevent the sealing ring 253 from detaching from the notch portion 251. The connecting portion 2533 connects the first arm 2531 and the second arm 2532 through the notch portion. The connecting portion 2533 has a concave arcuate surface. When the H-shaped members are buckled with each other, the arcuate surfaces thereof cooperatively define a hollow cavity for threading the wire.

In the case where a plurality of wires passes through the notch portion 251, if they thread through the notch portion 251 as a whole, since the wires have a circular cross section, the gaps formed among the wires reduce the sealing property. For this case, the arcuate surface of the connecting portion 2533 may be wavy to form a plurality of independent hollow cavities in the mounted state so as to better seal the wires having a circular cross section.

Figure 8:
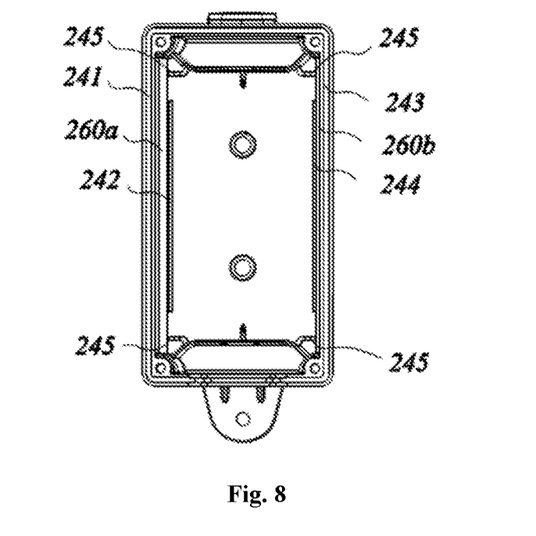
FIG. 8 is a top view of a lower sealing body according to an embodiment of the present invention.

Referring to FIG. 8, a plurality of metal plates 260 is disposed within the sealed box 200. The metal plates 260 are disposed between the vacuum pump 100 and the side wall of the sealed box 200. Due to the high density of the metal plates 260, the metal plates 260 can prevent the sound from being transmitted, and thus can have the effect of sound insulation and noise reduction.

Preferably, the metal plate 260 is an aluminum plate, a steel plate or a galvanized plate.

Figure 9:
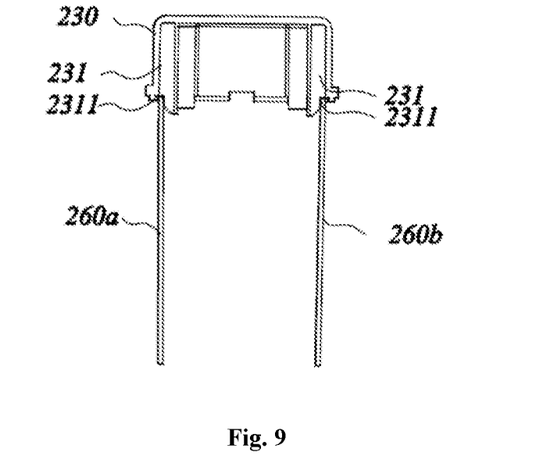
FIG. 9 is a schematic view of a mounting structure of an upper sealing body and a metal plate according to an embodiment of the present invention.

Referring to FIG. 8 and FIG. 9, in an embodiment of the present invention, there are two metal plates 260, which are disposed in close contact with two opposite walls of the sealed box 200, respectively. The lower sealing body 240 and the upper sealing body 230 are respectively provided with a limiting structure to fix the metal plates 260a and 260b.

FIG. 8 shows that the bottom wall of the lower sealing body 240 is provided with a first rib 242 which is parallel to the side wall 241 and spaced apart from the side wall 241 by a distance d, and a second rib 244 which is parallel to the side wall 243 and spaced apart from the side wall 243 by a distance D. The side wall 241 is opposite to the side wall 243, d is the thickness of the metal plate 260a, and D is the thickness of the metal plate 260b. The spacing between the first rib 242 and the side wall 241 forms a limiting groove for defining the metal plate 260a, and the spacing between the second rib 244 and the side wall 243 forms a limiting groove for defining the metal plate 260b, the two limiting grooves respectively define displacement of the metal plates 260a, 260b in the horizontal direction.

Figure 10:
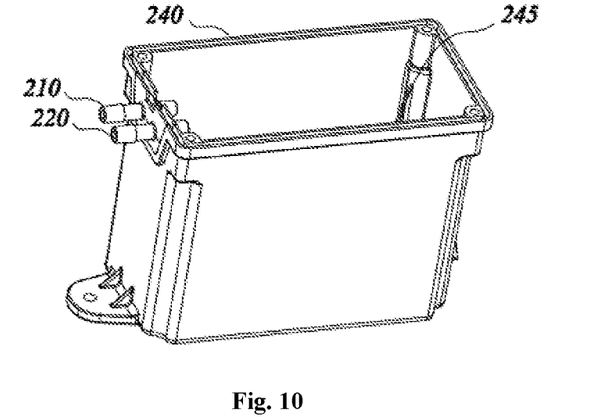
FIG. 10 is a schematic structural view of the lower sealing body according to an embodiment of the present invention.

Referring to FIG. 8 and FIG. 10, the lower sealing body 240 is further provided with a plurality of guiding grooves 245 which extends in the vertical direction. The extending direction of the plurality of guiding grooves 245 is the same as the insertion direction of the metal plates 260 when the metal plates 260 are mounted. The plurality of guiding grooves 245 is configured to guide the metal plates 260 to be mounted to the preset positions.

FIG. 9 shows that the upper sealing body 230 is provided with a plurality of resisting members 231. When the upper sealing body 230 and the lower sealing body 240 are buckled, the resisting members 231 abut against the top of the metal plate 260. The end of the resisting member 231 in contact with the metal plate 260 is provided with a step portion 2311 which cooperates with the side wall of the upper sealing body 230 to form an inverted U-shaped space for accommodating the top of the metal plate 260. The top surface of the step portion 2311 abuts against the top surface of the metal plate 260, and thus the displacement of the metal plate 260 in the vertical direction can be limited. The side surface of the step portion 2311 abuts against the side surface of the metal plate 260, and thus the displacement of the metal plate 260 in the horizontal direction can be limited.

The metal plate 260 is disposed in close contact with the side wall of the sealed box 200, and the vibration of the vacuum pump 100 may cause resonance of the metal plate 260, and thus new noise is formed and is conducted outwardly through the wall of the sealed box 200. The above-mentioned limiting structure strictly defines the position of the metal plate 260 to prevent noise generated by resonance.

In an embodiment of the invention, one of the upper sealing body 230 and the lower sealing body 240, or the buckling portion between the upper sealing body 230 and the lower sealing body 240 is provided with a notch portion 246 for threading an air pipe assembly.

Figure 11:
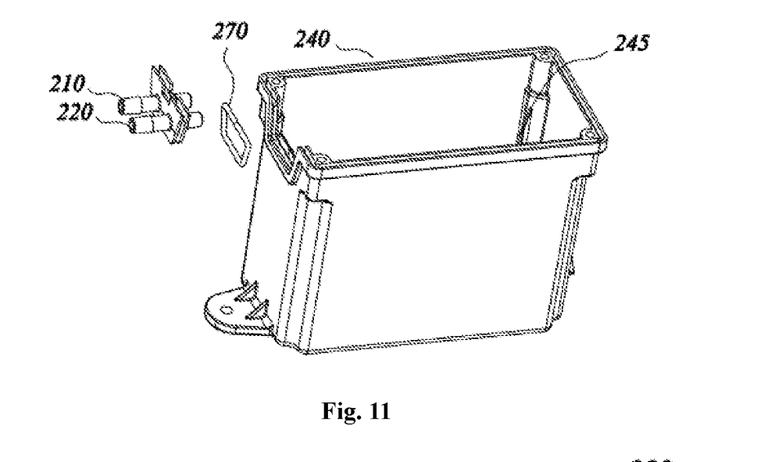
FIG. 11 is a schematic exploded view of FIG. 10.

FIG. 10 and FIG. 11 exemplarily show a case where the notch portion 246 is provided in the lower sealing body 240. The notch portion 246 is defined on the side wall of the lower sealing body 240 close to the upper edge thereof, and the notch portion 246 is peripherally provided with a groove to accommodate a sealing unit 270 for ensuring the air tightness of the sealed box 200. The sealing unit 270 is an annular structure made of an elastic material.

The air pipe assembly includes an inlet pipe 210, an outlet pipe 220, and a base plate which are integrally formed. The inlet pipe 210 and the outlet pipe 220 thread through the base plate, and the outer edge of the base plate is matched with the shape of the notch portion 246. The outer edge of the base plate is provided with a groove which is matched with a flange at the periphery of the notch portion 246, and thus the base plate can be clamped and fixed in the notch portion by the cooperation of the groove with the flange, and a sealing unit 270 is embedded in the gap between the groove and the flange.

The accommodating cavity in which the vacuum pump 100 is located is a compact space, which is disadvantageous for the connecting and the threading of the air pipelines. By providing the air pipe assembly as an embedded structure, it can be conveniently embedded and fixed in the notch portion 246 after being connected with the vacuum pump 100, and then the upper sealing body 230 and the lower sealing body 240 are buckled so as to complete the assembly.

Figure 12:
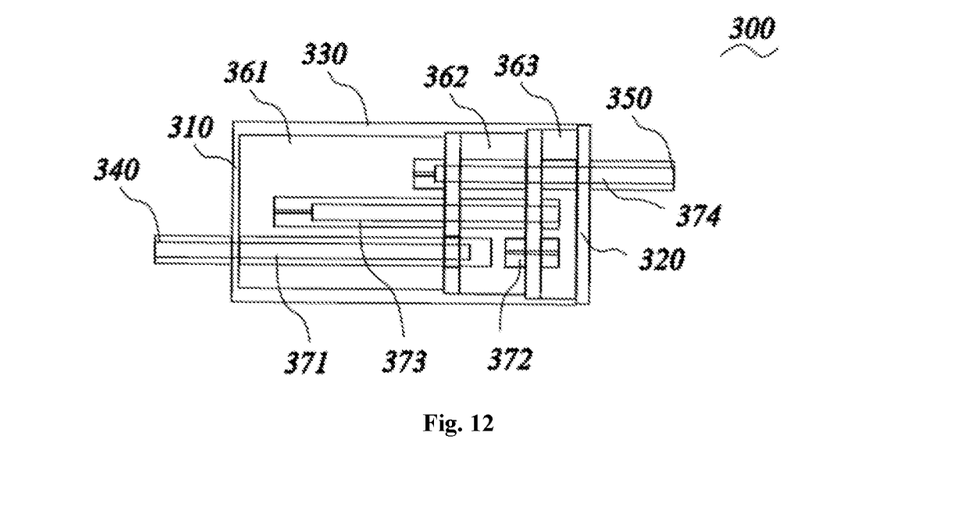
FIG. 12 is a schematic perspective view of a silencer according to an embodiment of the present invention.

The air from the outlet pipe 220 is silenced and then discharged to the outside of the refrigerator. Referring to FIG. 1 and FIG. 12, in an embodiment of the present invention, the vacuum pump 100 is connected with the silencer 300 via the outlet pipe 220. The silencer 300 includes a housing. The housing, which is a cylindrical hollow cavity, is defined by a first bottom surface 310 at the proximal end, a second bottom surface 320 at the distal end, and a side wall 330 connecting the first bottom surface 310 and the second bottom surface 320. An inlet opening 340 connected to the outlet pipe 220 is disposed at the proximal end of the silencer 300, and an outlet opening 350 is disposed at the distal end of the silencer 300. The cavity is divided into a plurality of chambers in the axial direction, that is, in the direction from the inlet opening 340 to the outlet opening 350, and at least some of the chambers have different volumes to correspondingly eliminate sounds of different frequency bands. Exemplarily, the volume of the chambers gradually decreases in the axial direction.

Preferably, there are three chambers, which are a first chamber 361, an intermediate chamber 362 and a second chamber 363 sequentially arranged from the proximal end to the distal end. The first chamber 361 is adjacent to the first bottom surface 310, the second chamber 363 is adjacent to the second bottom surface 320, and the intermediate chamber 362 is located between the first chamber 361 and the second chamber 363. The first conduit 371 communicates the inlet opening 340 and the intermediate chamber 362; the second conduit 372 communicates the intermediate chamber 362 and the second chamber 363; the third conduit 373 communicates the first chamber 361 and the second chamber 363; and the fourth conduit 374 communicates the first chamber 361 and the outlet opening 350.

There may be a plurality of the intermediate chambers 362.

The shape of the housing of the silencer is not limited to be cylindrical, and may be rectangular or irregular.

The sound waves transmitted from the vacuum pump 100 sequentially pass through the first conduit 371, the second conduit 372, the third conduit 373, and the fourth conduit 374 with the airflow. The sound waves are reflected and refracted sequentially in the intermediate chamber 362, the second chamber 363, and the first chamber 361 which have different volumes, and thus the energy of the sound waves is gradually dissipated. The first chamber 361, the intermediate chamber 362, and the second chamber 363 are used for silencing noise with low, medium, and high frequencies, respectively. Moreover, the first conduit 371, the second conduit 372, the third conduit 373, and the fourth conduit 374 are provided with narrow inner diameters such that part of the sound wave energy is converted into heat energy and is dissipated when the sound waves pass.

The silencer is configured in such a way that the sound waves travel in the silencer as long as possible so as to reduce their energy, and the refraction and reflection are achieved in different chambers, and a better silencing effect can be achieved by a small silencer axial distance.

Figure 13:
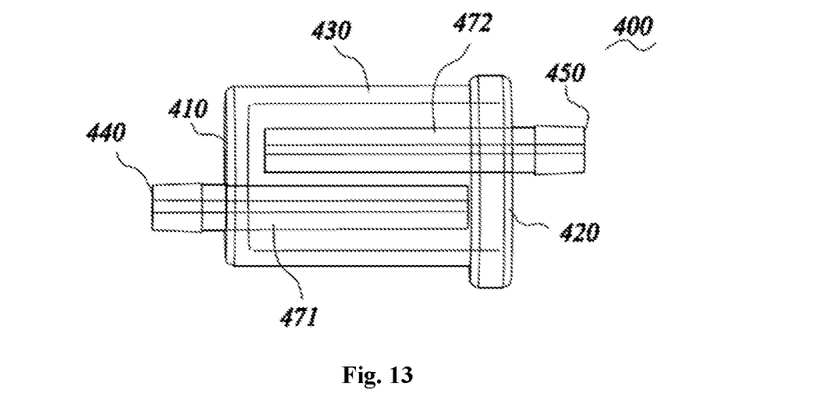
FIG. 13 is a schematic perspective view of the silencer according to still another embodiment of the present invention.

Referring to FIG. 13, in still another embodiment of the present invention, the silencer 400 includes a housing. The housing, which is a cylindrical hollow cavity, is defined by a first bottom surface 410 at the proximal end, a second bottom surface 420 at the distal end, and a side wall 430 connecting the first bottom surface 410 and the second bottom surface 420. A single chamber is formed within the cavity. An inlet opening 440 connected to the outlet pipe 220 is disposed at the proximal end of the silencer 400, and an outlet opening 450 is disposed at the distal end of the silencer 400. The first conduit 471 communicates the inlet opening 440 and the chamber, and the distal end of the first conduit 471 is close to the second bottom surface 420. The second conduit 472 communicates the chamber and the outlet opening 450, and the proximal end of the second conduit 472 is close to the first bottom surface 420.

The sound waves are reflected and refracted in the chambers, and thus the sound wave energy is gradually dissipated. The length of each of the first conduit 471 and the second conduit 472 is a quarter of the wavelength of the target audio frequency, so as to specifically eliminate the sound of the target audio frequency. Preferably, the target audio frequency is 1000 Hz.

The first conduit 471 and the second conduit 472 are provided with narrow inner diameters such that part of the sound wave energy is converted into heat energy and is dissipated when the sound waves pass.

Among the noise which is conducted by air through the vacuum pump 100, the high-frequency noise cannot be heard by human ears, and the main interference to the user is the low-frequency noise. In this embodiment, the low-frequency noise can be eliminated in a targeted manner, which makes the structure of the silencer simple.

Figure 14:
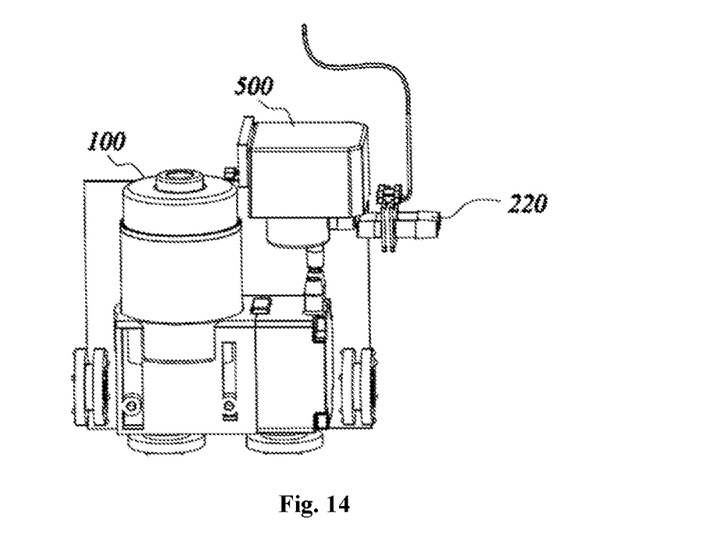
FIG. 14 is a schematic structural view of the vacuum pump and the silencer according to still another embodiment of the present invention.
Figure 15:
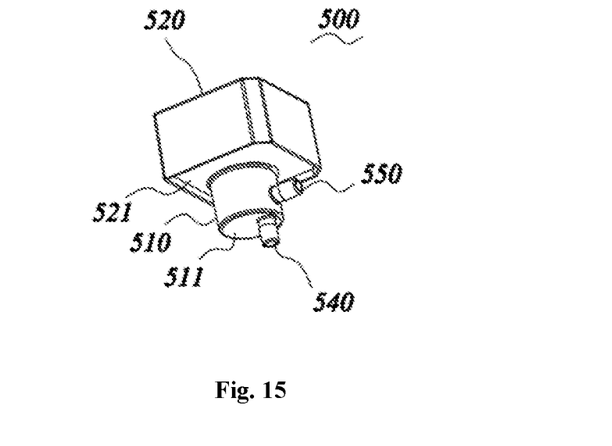
FIG. 15 is a schematic structural view of the silencer according to still another embodiment of the present invention.

Referring to FIG. 14 and FIG. 15, in still another embodiment of the present invention, the silencer 500 is disposed inside the sealed box 200, and is connected to the outlet pipeline of the vacuum pump 100 and the outlet pipe 220. The silencer 500 includes a housing. The housing defines a hollow cavity for refraction and reflection of sound waves. The hollow cavity includes a cylindrical chamber 510 and a rectangular chamber 520, one of the bottom surfaces of the cylindrical chamber 510 is connected to one surface 521 of the rectangular chamber 520, and the cylindrical chamber 510 is communicated with the inside of the rectangular chamber 520.

The diameter of the bottom surface of the cylindrical chamber 510 is less than or equal to the side length of the connecting surface 521 of the rectangular chamber 520.

The cylindrical chamber 510 of the silencer 500 is provided with an inlet opening 540 and an outlet opening 550. The inlet opening 540 is disposed at an angle with respect to the outlet opening 550, so that the air enters the hollow cavity and then is reflected and refracted before reaching the outlet opening. The energy loss occurs during this process to achieve silencing.

Preferably, the inlet opening 540 is disposed on the bottom surface 511 of the cylindrical chamber 510, and the outlet opening 550 is disposed on the side surface of the cylindrical chamber 510.

The inlet opening 540 has the same inner diameter as the outlet opening 550 to balance the pressures of the two openings.

In this embodiment, the sound waves are irregularly reflected and refracted by the change of the shape of the hollow cavity, and thus the sound wave energy is dissipated.

Figure 16:
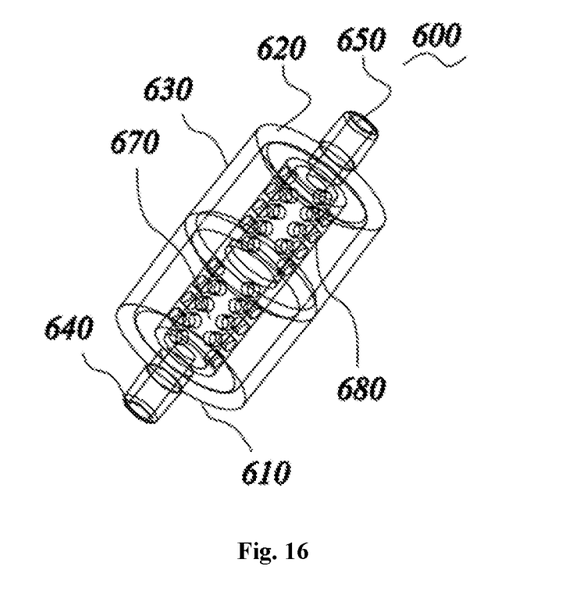
FIG. 16 is a perspective view of the silencer according to still another embodiment of the present invention.
Figure 17:
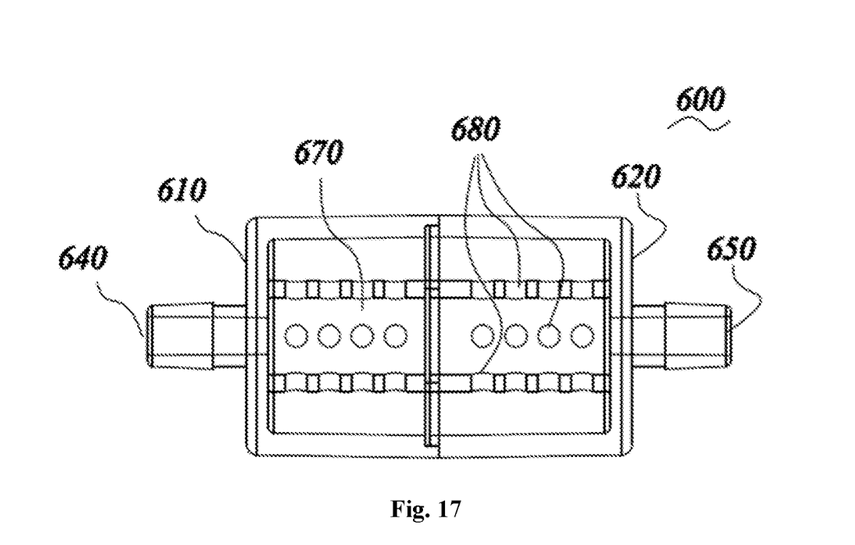
FIG. 17 is a schematic longitudinal cross-sectional view of the silencer according to still another embodiment of the present invention.

Referring to FIG. 16 and FIG. 17, in still another embodiment of the present invention, the silencer 600 includes a housing. The housing defines a hollow cavity. An inlet opening 640 is disposed at the proximal end of the silencer 600, and an outlet opening 650 is disposed at the distal end of the silencer 600. The inlet opening 640 and the outlet opening 650 are communicated by a conduit 670 disposed within the housing. The conduit 670 forms a sleeve structure with the housing. The conduit 670 is filled with a medium to absorb the vibrational energy of the sound waves so as to weaken the sound intensity. Further, the medium is a sound-absorbing cotton.

A plurality of through holes 680 is defined in the side wall of the conduit 670 to enable the conduit 670 to be communicated with the cavity. The through holes 680 are distributed circumferentially and at intervals along the side wall of the conduit 670, that is, the conduit 670 is provided with the through holes 680 in a plurality of directions.

Preferably, the housing is defined by a first bottom surface 610 at the proximal end, a second bottom surface 620 at the distal end, and a side wall 630 connecting the first bottom surface 610 and the second bottom surface 620, so as to form a cylindrical hollow cavity. The first bottom surface 610 is provided with the inlet opening 640, and the second bottom surface 620 is provided with the outlet opening 650.

Preferably, the diameter of the through hole is less than 1 mm.

Preferably, the cavity defined by the housing is divided into a plurality of chambers arranged from the proximal end to the distal end.

The sound waves from the vacuum pump 100 enter the conduit 670 from the inlet opening 640, and are silenced by the medium before reaching the outlet opening 650. The sound waves of specific frequencies are attenuated, and the sound intensity thereof is weakened. During this process, a part of the sound waves are diffracted into the cavity via the through holes 680, and are refracted and reflected in the cavity to be further attenuated.

The silencer is configured in such a way that the medium silencing and the cavity silencing are combined, and the small holes are used to realize the diffraction of the sound waves, and thus the sound intensity is weakened in multiple ways.

It should be understood that although the description is described according to the above embodiments, each embodiment may not only include one independent technical solution. The presentation manner of the description is only for the sake of clarity. Those skilled in the art should take the description as an integral part. The technical solutions of the respective embodiments may be combined properly to form other embodiments understandable by those skilled in the art.

The above detailed description only illustrates the feasible embodiments of the present invention, and is not intended to limit the protection scope of the present invention. Equivalent embodiments or modifications within the scope and spirit of the present invention shall be embraced by the protection scope of the present invention.

What is claimed is:

1. A vacuum assembly for a refrigerator, comprising:
  a sealed box comprising an upper sealing body and a lower sealing body, wherein the upper sealing body and the lower sealing body are buckled to define an accommodating cavity, and a notch portion is provided at the joint between the upper sealing body and the lower sealing body;
  a vacuum pump disposed in the accommodating cavity; and
  a seal comprising a buckling portion and an annular portion connected with the buckling portion, wherein the buckling portion is composed of two H-shaped members that are flexibly connected; the two H-shaped members are buckled with each other to form a mounted state; both of the two H-shaped members respectively have a first arm and a second arm which are parallel to each other, and a connecting portion which connects the first arm and the second arm; the connecting portion has an arcuate surface; and the arcuate surfaces of the two H-shaped members cooperatively define a hollow cavity when the two H-shaped members are in the mounted state, the annular portion is matched with an engaging portion between the upper sealing body and the lower sealing body, and the mounted state of the buckling portion is matched with the notch portion.

2. The vacuum assembly for the refrigerator according to claim 1, wherein the first arm and the second arm are clamped on the edge of the notch portion when the two H-shaped members are in the mounted state.

3. The vacuum assembly for the refrigerator according to claim 1, wherein the bottom of the upper sealing body is provided with a first groove, and the top of the lower sealing body is provided with a second groove; the first groove and the second groove cooperatively define a mounting position of the annular portion of the seal.

4. The vacuum assembly for the refrigerator according to claim 1, wherein the connecting portion connects the first arm and the second arm through the notch portion.

5. The vacuum assembly for the refrigerator according to claim 1, wherein a wire connected to the vacuum pump passes through the notch portion.

6. The vacuum assembly for a refrigerator according to claim 1, wherein the seal is an elastic member.

7. The vacuum assembly for a refrigerator according to claim 1, wherein the arcuate surface is wavy, and the arcuate surfaces of the two H-shaped members cooperatively define a plurality of hollow cavities when the two H-shaped members are in the mounted state.

8. The vacuum assembly for a refrigerator according to claim 1, wherein the annular portion and the buckling portion are integrally formed.

9. A refrigerator, comprising:
a sealed box comprising an upper sealing body and a lower sealing body, wherein the upper sealing body and the lower sealing body are buckled to define an accommodating cavity, and a notch portion is provided at the joint between the upper sealing body and the lower sealing body; and
a seal comprising a buckling portion and an annular portion connected with the buckling portion, wherein the buckling portion is composed of two H-shaped members that are flexibly connected; the two H-shaped members are buckled with each other to form a mounted state; both of the two H-shaped members respectively have a first arm and a second arm which are parallel to each other, and a connecting portion which connects the first arm and the second arm; the connecting portion has an arcuate surface; and the arcuate surfaces of the two H-shaped members cooperatively define a hollow cavity when the two H-shaped members are in the mounted state, the annular portion is matched with an engaging portion between the upper sealing body and the lower sealing body, and a mounted state of the engaging portion is matched with the notch portion.

* * * * *